US011380198B2

(12) United States Patent
Ucar et al.

(10) Patent No.: US 11,380,198 B2
(45) Date of Patent: Jul. 5, 2022

(54) MANAGING ANOMALIES AND ANOMALY-AFFECTED ENTITIES

(71) Applicant: Toyota Motor Engineering & Manufacturing North America, Inc., Erlanger, KY (US)

(72) Inventors: Seyhan Ucar, Mountain View, CA (US); Shalini Keshavamurthy, Mountain View, CA (US); Kentaro Oguchi, Mountain View, CA (US)

( * ) Notice: Subject to any disclaimer, the term of this patent is extended or adjusted under 35 U.S.C. 154(b) by 288 days.

(21) Appl. No.: 16/567,974

(22) Filed: Sep. 11, 2019

(65) Prior Publication Data

US 2021/0074154 A1      Mar. 11, 2021

(51) Int. Cl.
G08G 1/0967        (2006.01)
G08G 1/01          (2006.01)
H04W 4/46          (2018.01)

(52) U.S. Cl.
CPC ..... *G08G 1/096725* (2013.01); *G08G 1/0133* (2013.01); *G08G 1/0141* (2013.01); *G08G 1/096791* (2013.01); *H04W 4/46* (2018.02)

(58) Field of Classification Search
CPC ........... G08G 1/096725; G08G 1/0133; G08G 1/0141; G08G 1/096791; H04W 4/46; G05D 1/0055

See application file for complete search history.

(56) References Cited

U.S. PATENT DOCUMENTS

| | | | |
|---|---|---|---|
| 7,983,836 B2 | 7/2011 | Breed | |
| 8,350,696 B2 | 1/2013 | McClellan et al. | |
| 9,805,601 B1 * | 10/2017 | Fields | G08G 1/096844 |
| 9,904,289 B1 * | 2/2018 | Hayward | G01S 19/47 |
| 9,940,834 B1 * | 4/2018 | Konrardy | G08G 1/165 |
| 10,102,744 B2 | 10/2018 | Dhondse et al. | |
| 10,296,794 B2 * | 5/2019 | Ratti | G06V 10/25 |
| 10,324,463 B1 * | 6/2019 | Konrardy | G05D 1/0278 |
| 10,395,332 B1 * | 8/2019 | Konrardy | G05D 1/0246 |
| 10,595,175 B2 * | 3/2020 | Ramalho de Oliveira | G08G 1/0112 |
| 10,824,145 B1 * | 11/2020 | Konrardy | G06Q 10/1095 |
| 10,967,862 B2 * | 4/2021 | Bonk | G08G 1/096838 |
| 2014/0195112 A1 | 7/2014 | Lu et al. | |
| 2017/0279827 A1 * | 9/2017 | Savalle | H04L 63/1425 |
| 2017/0279834 A1 * | 9/2017 | Vasseur | H04L 63/02 |

(Continued)

OTHER PUBLICATIONS

Weil, et al., "Traffic Incident Detection: Sensors and Algorithms," Mathl. Comput. Modelling vol. 27, No. 9-11, 1998, pp. 257-291.

(Continued)

*Primary Examiner* — Luis A Martinez Borrero
(74) *Attorney, Agent, or Firm* — Burbage Law, P.C.; Jon-Michael Burbage

(57) ABSTRACT

The disclosure includes embodiments for managing an anomaly and anomaly-affected entities. In some embodiments, a method includes receiving anomaly data describing an occurrence of the anomaly in a roadway environment. The method includes determining an influence region of the anomaly in the roadway environment. The method includes determining a set of anomaly severity indices associated with a set of sub-regions within the influence region. The method includes managing a group of anomaly-affected entities within the influence region based on the set of anomaly severity indices.

20 Claims, 7 Drawing Sheets

(56) References Cited

U.S. PATENT DOCUMENTS

| | | | |
|---|---|---|---|
| 2018/0061230 A1 | 3/2018 | Madigan et al. | |
| 2018/0376305 A1* | 12/2018 | Ramalho de Oliveira | ................. H04W 4/44 |
| 2018/0376306 A1* | 12/2018 | Ramalho de Oliveira | ................. H04W 88/10 |
| 2019/0135283 A1* | 5/2019 | Bonk | ................... G05D 1/0231 |
| 2020/0317216 A1* | 10/2020 | Konrardy | ............ B60W 30/182 |
| 2021/0129845 A1* | 5/2021 | Bonk | ..................... G01C 21/16 |
| 2022/0019823 A1* | 1/2022 | Ucar | ................... G06K 9/6254 |

OTHER PUBLICATIONS

El-Wakeel, et al., "Towards a Practical Crowdsensing System for Road Surface Conditions Monitoring," IEEE Internet of Things Journal, vol. 5, Issue 6, Dec. 2018, pp. 4672-4685.

Salau, et al, "A Survey of Accelerometer-Based Techniques for Road Anomalies Detection and Characterization," International Journal of Engineering Science and Application, vol. 3, Nov. 1, 2019, pp. 8-20.

Kyriakou, et al, "Smartphone-Based Pothole Detection Utilizing Artificial Neural Networks," Journal of Infrastructure Systems, 25(3), 2019, 8 pages.

Gonzalez, et al., "Multidimensional data mining of traffic anomalies on large-scale road networks," Transportation Research Records: Journal of the Transportation Research Board, No. 2215, 2011, pp. 75-84.

Meiring, et al., "A review of intelligent driving style analysis systems and related artificial intelligence algorithms," Sensors 2015, 15, pp. 30653-30682.

Halim, et al., "Artificial intelligence techniques for driving safety and vehicle crash prediction," Artificial Intelligence Review, 2016, 37 pages.

\* cited by examiner

MANAGING ANOMALIES AND ANOMALY-AFFECTED ENTITIES

BACKGROUND

The specification relates to managing an anomaly and one or more entities that are affected by the anomaly in a roadway environment.

An anomaly may include an action done in an unusual time (e.g., relative to a typical time for a particular geographic location) or an unusual location (e.g., relative to a typical location). For example, an anomaly includes an unusual action that does not typically occur or infrequently occurs relative to the types of actions that are typical for a particular geographic location. An occurrence of an anomaly in a roadway environment may jeopardize safety of various roadway participants (e.g., vehicles, drivers, passengers, pedestrians, bikers, etc.). The occurrence of the anomaly may also reduce efficiency of a transportation system in the roadway environment.

SUMMARY

One general aspect of embodiments described herein includes a computer program product including a non-transitory memory of a computer system storing computer-executable code that, when executed by a processor, causes the processor to: receive anomaly data describing an occurrence of an anomaly in a roadway environment; determine an impact of the anomaly; determine an influence region of the anomaly based on the impact of the anomaly; determine a set of anomaly severity indices associated with a set of sub-regions within the influence region; and generate a set of control strategies to manage a group of anomaly-affected entities within the influence region based on the set of anomaly severity indices. Other embodiments of this aspect include corresponding computer systems, apparatus, and computer programs recorded on one or more computer storage devices, each configured to perform the actions of the methods.

Implementations may include one or more of the following features. The computer program product where the computer-executable code, when executed by the processor, causes the processor to generate the set of control strategies to manage the group of anomaly-affected entities within the influence region at least by: identifying, for each sub-region from the set of sub-regions, one or more anomaly-affected entities within the sub-region; generating a corresponding control strategy to manage the one or more anomaly-affected entities within the sub-region based on a corresponding anomaly severity index associated with the sub-region; and instructing the one or more anomaly-affected entities within the sub-region to execute the corresponding control strategy. The computer program product where the computer-executable code, when executed by the processor, causes the processor to identify, for each sub-region from the set of sub-regions, the one or more anomaly-affected entities within the sub-region at least by: receiving hierarchical Artificial Intelligence (AI) data that describes one or more of real-time traffic information and predicted future traffic information in the roadway environment; and identifying the one or more anomaly-affected entities within the sub-region based on the hierarchical AI data. The computer program product where the group of anomaly-affected entities includes a group of vehicles present within the influence region. Implementations of the described techniques may include hardware, a method or process, or computer software on a computer-accessible medium.

One general aspect includes a method, including: receiving anomaly data describing an occurrence of an anomaly in a roadway environment; determining an influence region of the anomaly in the roadway environment; determining a set of anomaly severity indices associated with a set of sub-regions within the influence region; and managing a group of anomaly-affected entities within the influence region based on the set of anomaly severity indices. Other embodiments of this aspect include corresponding computer systems, apparatus, and computer programs recorded on one or more computer storage devices, each configured to perform the actions of the methods.

Implementations may include one or more of the following features. The method where managing the group of anomaly-affected entities within the influence region based on the set of anomaly severity indices includes: identifying, for each sub-region from the set of sub-regions, one or more anomaly-affected entities within the sub-region; generating a control strategy to manage the one or more anomaly-affected entities based on a corresponding anomaly severity index associated with the sub-region; and instructing the one or more anomaly-affected entities to execute the control strategy. The method where identifying, for each sub-region from the set of sub-regions, the one or more anomaly-affected entities within the sub-region includes: receiving hierarchical AI data that describes one or more of real-time traffic information and predicted future traffic information in the roadway environment; and identifying the one or more anomaly-affected entities within the sub-region based on the hierarchical AI data. The method where the control strategy includes one or more of the following: instructing the one or more anomaly-affected entities to change their lanes; controlling the one or more anomaly-affected entities to change their speeds; rerouting the one or more anomaly-affected entities; and detouring the one or more anomaly-affected entities. The method where the group of anomaly-affected entities includes a group of vehicles present within the influence region. The method where determining the influence region of the anomaly in the roadway environment includes one or more of the following: determining an impact of the anomaly; and determining the influence region of the anomaly based on one or more roadway condition parameters and the impact of the anomaly. The method where determining the set of anomaly severity indices associated with the set of sub-regions within the influence region includes: determining the set of anomaly severity indices based on the one or more roadway condition parameters; and dividing the influence region into the set of sub-regions so that each sub-region is associated with a corresponding anomaly severity index from the set of anomaly severity indices. The method where the one or more roadway condition parameters include one or more of a traffic condition parameter and a road geometry parameter. Implementations of the described techniques may include hardware, a method or process, or computer software on a computer-accessible medium.

One general aspect includes a system including a computer system including a non-transitory memory storing computer code which, when executed by the computer system, causes the computer system to: receive anomaly data describing an occurrence of an anomaly in a roadway environment; determine an influence region of the anomaly in the roadway environment; determine a set of anomaly severity indices associated with a set of sub-regions within the influence region; and manage a group of anomaly-affected entities within the influence region based on the set of anomaly severity indices. Other embodiments of this aspect include corresponding computer systems, apparatus, and computer programs recorded on one or more computer storage devices, each configured to perform the actions of the methods.

Implementations may include one or more of the following features. The system where the computer code, when executed by the computer system, causes the computer system to manage the group of anomaly-affected entities within the influence region at least by: identifying, for each sub-region from the set of sub-regions, one or more anomaly-affected entities within the sub-region; generating a control strategy to manage the one or more anomaly-affected entities based on a corresponding anomaly severity index associated with the sub-region; and instructing the one or more anomaly-affected entities to execute the control strategy. The system where the computer code, when executed by the computer system, causes the computer system to identify, for each sub-region from the set of sub-regions, the one or more anomaly-affected entities within the sub-region at least by: receiving hierarchical AI data that describes one or more of real-time traffic information and predicted future traffic information in the roadway environment; and identifying the one or more anomaly-affected entities within the sub-region based on the hierarchical AI data. The system where the control strategy includes one or more of the following: instructing the one or more anomaly-affected entities to change their lanes; controlling the one or more anomaly-affected entities to change their speeds; rerouting the one or more anomaly-affected entities; and detouring the one or more anomaly-affected entities. The system where the group of anomaly-affected entities includes a group of vehicles present within the influence region. The system where the computer code, when executed by the computer system, causes the computer system to determine the influence region of the anomaly in the roadway environment at least by: determining an impact of the anomaly; and determining the influence region of the anomaly based on one or more roadway condition parameters and the impact of the anomaly. The system where the computer code, when executed by the computer system, causes the computer system to determine the set of anomaly severity indices associated with the set of sub-regions within the influence region at least by: determining the set of anomaly severity indices based on the one or more roadway condition parameters; and dividing the influence region into the set of sub-regions so that each sub-region is associated with a corresponding anomaly severity index from the set of anomaly severity indices. The system where the one or more roadway condition parameters include one or more of a traffic condition parameter and a road geometry parameter. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
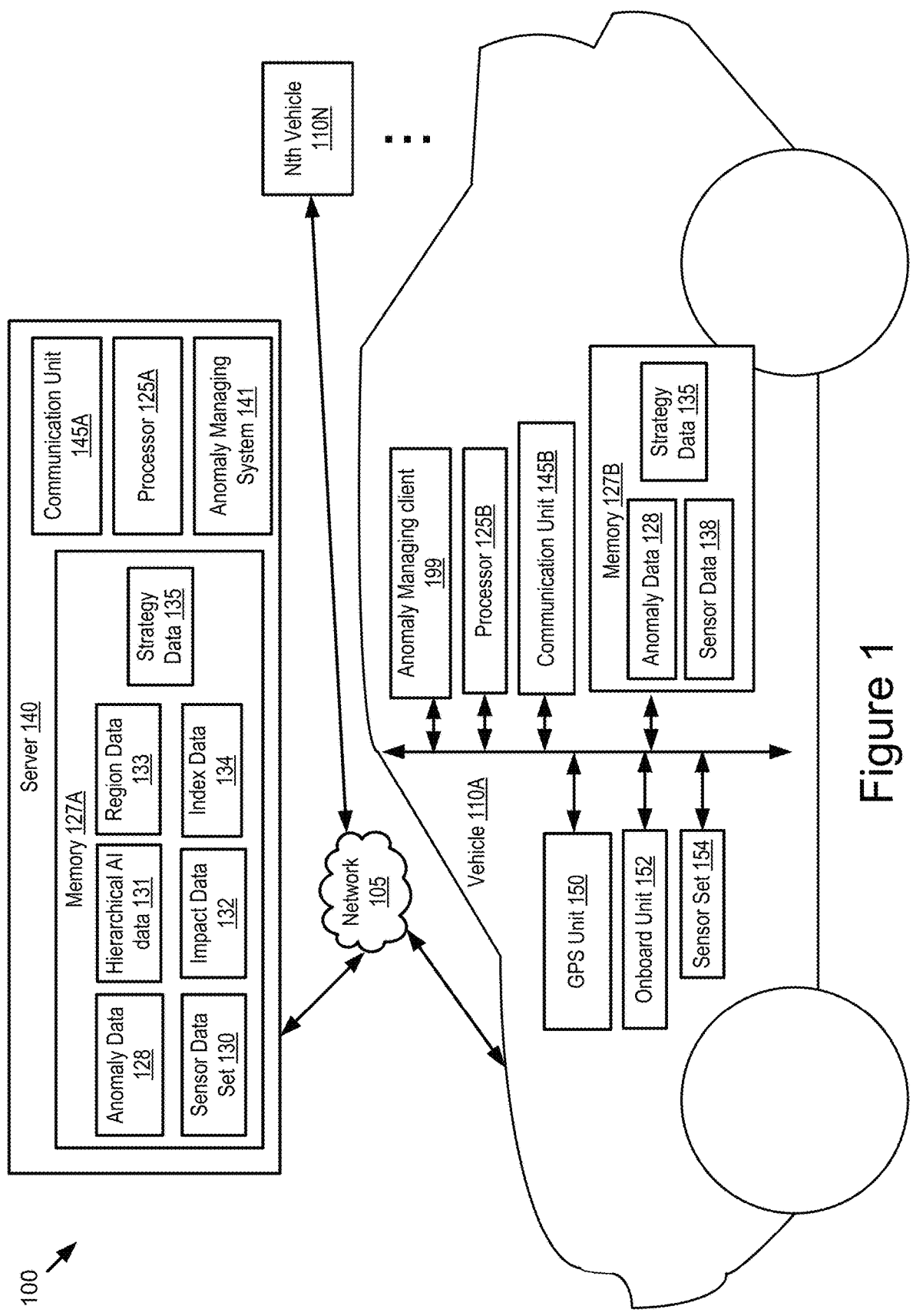
FIG. 1 is a block diagram illustrating an operating environment for an anomaly managing system and an anomaly managing client according to some embodiments.

A detection of an anomaly in a roadway environment can be implemented through different ways such as using machine learning algorithms, deep learning algorithms or misbehavior detection approaches via trust management or voting. However, merely the detection of the anomaly is not sufficient to mitigate an effect of the anomaly. Entities that are near the anomaly (e.g., behind or ahead of the anomaly) may need to be directed with proper control strategies so that the effect of the anomaly is minimized. The determination of which entities are affected by the anomaly and which control strategies are to be provided to the different entities is a challenging task.

Described herein are embodiments of an anomaly managing system installed in a server and an anomaly managing client installed in a vehicle. The anomaly managing system and the anomaly managing client may cooperate with one another to manage an anomaly that occurs in a roadway environment. The anomaly managing system and the anomaly managing client may cooperate with one another to manage entities that are affected by the anomaly (referred to as "anomaly-affected entities" hereinafter). As a result, an effect of the anomaly in the roadway environment can be minimized.

Specifically, the anomaly managing system hierarchically leverages large scale and fragmented vehicle data (e.g., sensor data) in real time or near real time to generate hierarchical AI data. The anomaly managing system incorporates the hierarchical AI data into a management of the anomaly and the anomaly-affected entities.

For example, when an anomaly is detected, the anomaly managing system computes a risk (or an impact) of the anomaly and determines an influence region around the anomaly. The influence region can be dynamically adjusted based on static or dynamic roadway condition parameters (e.g., a traffic condition parameter, a road geometry parameter, etc.). Based on the risk (or impact) of the anomaly, the anomaly managing system determines a set of Anomaly Severity Indices (ASIs) that is associated with a set of sub-regions within the influence region. Then, based on a hierarchical-AI assisted tracking of connected or non-connected entities in the roadway environment, the anomaly managing system identifies a group of anomaly-affected entities in the influence region. The anomaly managing system manages the group of anomaly-affected entities (which may themselves be members of a vehicular micro cloud) based on the set of anomaly severity indices. For example, the anomaly managing system generates a set of control strategies with different priorities based on the set of anomaly severity indices. The set of control strategies can be used to control behaviors of the corresponding anomaly-affected entities, respectively. As a result, an effect of the anomaly in the roadway environment is mitigated.

In some embodiments, anomaly-affected entities receive individualized route management from the anomaly managing system based on the severity of anomalies and whether the anomaly will affect the anomaly-affected entities. Individualized route management is route management which is tailored or customized for a specific individual connected vehicle. For example, some existing technologies provide the same route management to all vehicles, whereas some of the embodiments described herein do not provide the same route management instructions to all vehicles and instead provides individualized route management based on one or more of the following: the particular route (or location) of the particular vehicle; the proximity of this route (or location) to the anomaly; a type of the anomaly; a severity of the anomaly; etc.

In some embodiments, the hierarchical-AI assisted tracking provides real-time information, predicted information or a combination thereof of connected or non-connected entities in the roadway environment. The hierarchical-AI assisted tracking is used to dynamically compute a similarity score for each entity around the anomaly during the identification of the anomaly-affected entities.

Example improvements and advantages provided by the anomaly managing system and the anomaly managing client described herein are provided here. For example, different from existing solutions that only focus on a detection of an anomaly, the anomaly managing system described herein is capable of managing the anomaly and directing anomaly-affected entities to mitigate an effect of the anomaly. The anomaly managing system generates control strategies with different prioritizations to instruct the different anomaly-affected entities based on a set of anomaly severity indices. For example, entities around the anomaly may be affected by the anomaly differently so that control strategies with different levels of guidance and prioritization are provided to the entities to minimize the effect of the anomaly. Other example advantages are also possible.

As described herein, an anomaly includes, for example, one or more of the following: a human anomaly (e.g., a pedestrian suddenly screams); and a data anomaly (e.g., false acceleration information in platooning). In another example, an anomaly may include one or more of the following: a road surface anomaly (e.g., a hole on a road, rocks on a road, etc.); and a traffic anomaly (e.g., a lane merge from a wrong side, a lane closure, an accident, etc.). In yet another example, an anomaly may include a vehicle type anomaly (e.g., a police car, an ambulance, or a fire truck within a group of personal vehicles).

As described herein, an anomaly-affected entity may be any roadway participant in the roadway environment that is affected by the anomaly. For example, an anomaly-affected entity can be a vehicle, a driver, a passenger, a motorcycle, a bike operated by a biker or a pedestrian, etc. In the description provided herein, a vehicle is used as an example of the anomaly-affected entity for convenience of description. It is noted that the description provided herein can also be applied to any other type of anomaly-affected entities.

As described herein, examples of Vehicle-to-Everything (V2X) communications include: Dedicated Short-Range Communication (DSRC); Long-Term Evolution (LTE); and millimeter wave (mmWave) communication. Examples of DSRC include Basic Safety Messages (BSMs) and Personal Safety Messages (PSMs), among other types of DSRC communication). Other examples of the V2X communications include, but are not limited to, one or more of the following: 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Example Overview

Referring to FIG. 1, depicted is an operating environment 100 for an anomaly managing system 141 and an anomaly managing client 199 according to some embodiments. The operating environment 100 may include one or more of the following elements: one or more vehicles 110A, . . . , 110N (e.g., referred to as vehicle 110, individually or collectively); and a server 140. These elements of the operating environment 100 may be communicatively coupled to a network 105. In practice, the operating environment 100 may include any number of vehicles 110, servers 140 and networks 105.

In some embodiments, the vehicle 110A-110N may be members of a vehicular micro cloud. Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS) and multimedia messaging service (MMS). In some embodiments, the network 105 further includes networks for hypertext transfer protocol (HTTP), direct data connection, wireless application protocol (WAP), e-mail, DSRC, full-duplex wireless communication and mmWave. In some embodiments, the network 105 further includes networks for WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE, 5G-V2X or any other mobile data network. The network 105 may also include any combination of mobile data networks. Further, the network 105 may include one or more IEEE 802.11 wireless networks.

The server 140 may be any server that includes one or more processors and one or more memories. For example, the server 140 may be a cloud server, an edge server, or any other type of server. In some embodiments, the server 140 may include one or more of the following elements: a processor 125A; a memory 127A; a communication unit 145A; and the anomaly managing system 141.

In some embodiments, the processor 125A and the memory 127A may be elements of a computer system (such as computer system 200 described below with reference to FIG. 2). The computer system may be operable to cause or control the operation of the anomaly managing system 141. For example, the computer system may be operable to access and execute the data stored on the memory 127A to provide the functionality described herein for the anomaly managing system 141 or its elements (see, e.g., FIG. 2).

The processor 125A includes an arithmetic logic unit, a microprocessor, a general-purpose controller, or some other processor array to perform computations and provide electronic display signals to a display device. The processor 125A processes data signals and may include various computing architectures. Example computing architectures include a complex instruction set computer (CISC) architecture, a reduced instruction set computer (RISC) architecture, or an architecture implementing a combination of instruction sets. The server 140 may include one or more processors 125A. Other processors, operating systems, sensors, displays, and physical configurations may be possible.

The memory 127A stores instructions or data that may be executed by the processor 125A. The instructions or data may include code for performing the techniques described herein. The memory 127A may be a dynamic random-access memory (DRAM) device, a static random-access memory (SRAM) device, flash memory, or some other memory device. In some embodiments, the memory 127A also includes a non-volatile memory or similar permanent storage device and media. Example permanent storage devices include a hard disk drive, a floppy disk drive, a CD-ROM device, a DVD-ROM device, a DVD-RAM device, a DVD-RW device, and a flash memory device, etc. Additional example permanent storage devices may include some other mass storage device for storing information on a more permanent basis. The server 140 may include one or more memories 127A.

The memory 127A may store one or more of the following elements: anomaly data 128; a sensor data set 130; hierarchical AI data 131; impact data 132; region data 133; index data 134; and strategy data 135.

The anomaly data 128 may include digital data that describes an anomaly that occurs in a roadway environment. In some embodiments, the anomaly data 128 may include digital data describing a type of the anomaly, a location of the anomaly, a time when the anomaly occurs, or any other data related to the anomaly. In some embodiments, the anomaly data 128 may be received from a party (e.g., a vehicle, a server, etc.) that detects an occurrence of the anomaly.

The sensor data set 130 may include various sensor data received from various vehicles 110, roadside units or any other infrastructure devices in the roadway environment.

The hierarchical AI data 131 may include digital data that describes one or more of the following: real-life traffic information; real-time traffic information; and predicted future traffic information. The hierarchical AI data 131 can be generated based on sensor data included in the sensor data set 130. For example, the hierarchical AI data 131 includes real-time information, predicted information or a combination thereof of connected or non-connected entities present in the roadway environment. The real-time information may include data describing a current location, a current speed, and a current heading, etc., of the connected or non-connected entities. The predicted information may include data describing a predicted location, a predicted speed, and a predicted heading, etc., of the connected or non-connected entities in a future time window.

The impact data 132 can include digital data describing an impact of the anomaly in the roadway environment.

The region data 133 can include digital data describing an influence region of the anomaly.

The index data 134 can include digital data describing a set of anomaly severity indices associated with the anomaly. For example, the influence region can be divided into a set of sub-regions with each sub-region associated with a corresponding anomaly severity index so that a set of anomaly severity indices is generated for the influence region. In some embodiments, the set of anomaly severity indices may include one or more anomaly severity indices. Each anomaly severity index may indicate a different impact-severity level of the anomaly imposed on the roadway environment.

For example, the set of anomaly severity indices includes a level-1 index (ASI-1), a level-2 index (ASI-2) and a level-3 index (ASI-3) that are associated with three sub-regions within the influence region. The level-1 index indicates that an impact-severity level of the anomaly is urgent, and a first sub-region associated with the level-1 index includes a first area that is immediately around (e.g., just behind or ahead of) the anomaly. The level-2 index indicates that an impact-severity level of the anomaly is intermediate. A second sub-region associated with the level-2 index includes a second area that is following the first sub-region and further away from the anomaly when compared to the first sub-region. The level-3 index indicates that an impact-severity level of the anomaly is moderate, and a third sub-region associated with the level-3 index includes a third area that is following the second sub-region. An example of the anomaly severity indices and their associated sub-regions is illustrated with reference to FIG. 6.

The strategy data 135 can include digital data describing a set of control strategies for managing anomaly-affected entities in the influence region. Each anomaly severity index may correspond to a corresponding control strategy. Anomaly-affected entities located in a same sub-region associated with an anomaly severity index are managed by a control strategy that corresponds to the anomaly severity index. Anomaly-affected entities located in different sub-regions are managed by different control strategies.

The communication unit 145A transmits and receives data to and from the network 105 or to another communication channel. In some embodiments, the communication unit 145A may include a DSRC transceiver, a DSRC receiver and other hardware or software necessary to make the server 140 a DSRC-enabled device. For example, the communication unit 145A includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods. Example wireless communication methods may include one or more of the following: IEEE 802.11; and IEEE 802.16, BLUETOOTH®. Example wireless communication methods may further include EN ISO 14906:2004 Electronic Fee Collection—Application interface EN 11253:2004 DSRC—Physical layer using microwave at 5.8 GHz (review). Example wireless communication methods may further include EN 12795:2002 DSRC—DSRC Data link layer: Medium Access and Logical Link Control (review). Example wireless communication methods may further include EN 12834:2002 DSRC—Application layer (review) and EN 13372:2004 DSRC—DSRC profiles for RTTT applications (review). Example wireless communication methods may further include the communication method described in U.S. patent application Ser. No. 14/471,387 filed on Aug. 28, 2014 and entitled "Full-Duplex Coordination System"; or another suitable wireless communication method.

In some embodiments, the communication unit 145A includes a cellular communications transceiver for sending and receiving data over a cellular communications network. For example, the data may be sent or received via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

The communication unit 145A may include a V2X radio. The V2X radio may include a hardware element including a DSRC transmitter which is operable to transmit DSRC messages on the 5.9 GHz band. The 5.9 GHz band is reserved for DSRC messages. The hardware element may also include a DSRC receiver which is operable to receive DSRC messages on the 5.9 GHz band.

The anomaly managing system 141 includes software that is operable to manage an anomaly and anomaly-affected entities. In some embodiments, the anomaly managing system 141 may be implemented using hardware including a field-programmable gate array ("FPGA") or an application-specific integrated circuit ("ASIC"). In some other embodiments, the anomaly managing system 141 may be implemented using a combination of hardware and software. The anomaly managing system 141 may be stored in a combination of the devices (e.g., servers or other devices), or in one of the devices.

Although the anomaly managing system 141 is installed in the server 140 in FIG. 1, in some embodiments the anomaly managing system 141 may also be installed in a vehicle (e.g., a leader vehicle of a vehicle platoon, a leader vehicle of a vehicular micro cloud).

The anomaly managing system 141 is described below in more detail with reference to FIGS. 2-6.

The vehicle 110 may be any type of vehicle. For example, the vehicle 110 may include one of the following types of vehicles: a car; a truck; a sports utility vehicle; a bus; a semi-truck; a drone; or any other roadway-based convey-ance. The vehicle 110 may be a connected vehicle that includes a communication unit and is capable of communicating with other endpoints connected to the network 105.

In some embodiments, the vehicle 110 is a DSRC-enabled vehicle which includes a DSRC radio and a DSRC-compliant Global Positioning System (GPS) unit. The vehicle 110 may also include other V2X radios besides a DSRC radio. DSRC is not a requirement of embodiments described herein, and any form of V2X communications is also feasible.

The vehicle 110 may include one or more of the following elements: a processor 125B; a memory 127B; a communication unit 145B; a GPS unit 150; an onboard unit 152; a sensor set 154; and the anomaly managing client 199. These elements of the vehicle 110 may be communicatively coupled to one another via a bus.

The processor 125B, the memory 127B and the communication unit 145B may provide functionality similar to that of the processor 125A, the memory 127A and the communication unit 145A, respectively. Similar description will not be repeated here.

The memory 127B may store one or more of the following elements: the anomaly data 128; the strategy data 135; and sensor data 138. The anomaly data 128 and the strategy data 135 are described above, and similar description will not be repeated here.

The sensor data 138 may include digital data describing one or more sensor measurements of the sensor set 154. For example, the sensor data 138 may include vehicle data describing the vehicle 110 (e.g., GPS location data, speed data, heading data, etc.) and other sensor data describing a roadway environment (e.g., camera data depicting a roadway, etc.).

The sensor set 154 includes one or more sensors that are operable to measure a roadway environment outside of the vehicle 110. For example, the sensor set 154 may include one or more sensors that record one or more physical characteristics of the roadway environment that is proximate to the vehicle 110. The memory 127B may store the sensor data 138 that describes the one or more physical characteristics recorded by the sensor set 154.

The sensor set 154 may also include various sensors that record an environment internal to a cabin of the vehicle 110. For example, the sensor set 154 includes onboard sensors which monitor the environment of the vehicle 110 whether internally or externally. In a further example, the sensor set 154 includes cameras, LIDAR, radars, infrared sensors, and sensors that observe the behavior of the driver such as internal cameras, biometric sensors, etc.

In some embodiments, the sensor set 154 may include one or more of the following vehicle sensors: a camera; a LIDAR sensor; a radar sensor; a laser altimeter; an infrared detector; a motion detector; a thermostat; and a sound detector. The sensor set 154 may also include one or more of the following sensors: a carbon monoxide sensor; a carbon dioxide sensor; an oxygen sensor; a mass air flow sensor; and an engine coolant temperature sensor. The sensor set 154 may also include one or more of the following sensors: a throttle position sensor; a crank shaft position sensor; an automobile engine sensor; a valve timer; an air-fuel ratio meter; and a blind spot meter. The sensor set 154 may also include one or more of the following sensors: a curb feeler; a defect detector; a Hall effect sensor, a manifold absolute pressure sensor; a parking sensor; a radar gun; a speedometer; and a speed sensor. The sensor set 154 may also include one or more of the following sensors: a tire-pressure monitoring sensor; a torque sensor; a transmission fluid temperature sensor; and a turbine speed sensor (TSS); a variable reluctance sensor; and a vehicle speed sensor (VSS). The sensor set 154 may also include one or more of the following sensors: a water sensor; a wheel speed sensor; and any other type of automotive sensor.

In some embodiments, the GPS unit 150 is a conventional GPS unit of the vehicle 110. For example, the GPS unit 150 may include hardware that wirelessly communicates with a GPS satellite to retrieve data that describes a geographic location of the vehicle 110. In some embodiments, the GPS unit 150 is a DSRC-compliant GPS unit of the vehicle 110. The DSRC-compliant GPS unit is operable to provide GPS data describing the geographic location of the vehicle 110 with lane-level accuracy.

The onboard unit 152 can include one or more processors and one or more memories. For example, the onboard unit 152 may be an electronic control Unit (ECU). The onboard unit 152 may control an operation of the sensor set 154 and the anomaly managing client 199 of the vehicle 110. In some embodiments, the anomaly managing client 199 is installed in the onboard unit 152.

The anomaly managing client 199 includes software that is operable to operate the vehicle 110 based on a control strategy. In some embodiments, the anomaly managing client 199 may be implemented using hardware including an FPGA or an ASIC. In some other embodiments, the anomaly managing client 199 may be implemented using a combination of hardware and software. The anomaly managing client 199 may be stored in a combination of the devices (e.g., servers or other devices), or in one of the devices.

A swarm function is now described according to some embodiments. In some embodiments, the swarm function is ordered by the anomaly managing system 141 and executed by the anomaly managing client 199 of a plurality of vehicles 110. A swarm function includes a route management instruction provided by the anomaly managing system 141 to the anomaly managing clients 199 of the plurality of vehicles 110 which instructs the vehicles 110 to navigate to navigate to a region at a similar time and drive in a formation which is operable to reduce or eliminate a risk caused by an anomaly.

For example, assume a scenarios in which the vehicles 110 are autonomous vehicles (no passenger and/or driver) that in the vicinity of an anomaly (i.e. aggressive driver). The anomaly managing system 141 may provide route management instructions to these vehicles 110 that causes them to drive to where the aggressive driver is located, create a barrier for the aggressive driver, and drive in formation to track the position of the aggressive driver so that the barrier is maintained and the dynamics of the aggressive driver are reduced. Reducing the dynamics of the aggressive driver includes, for example, making it harder for the aggressive driver to change lanes or speed up without causing a collision or some other negative consequence for the aggressive driver.

The anomaly managing client 199 is described below in more detail with reference to FIG. 5A.

Example Computer System

Figure 2:
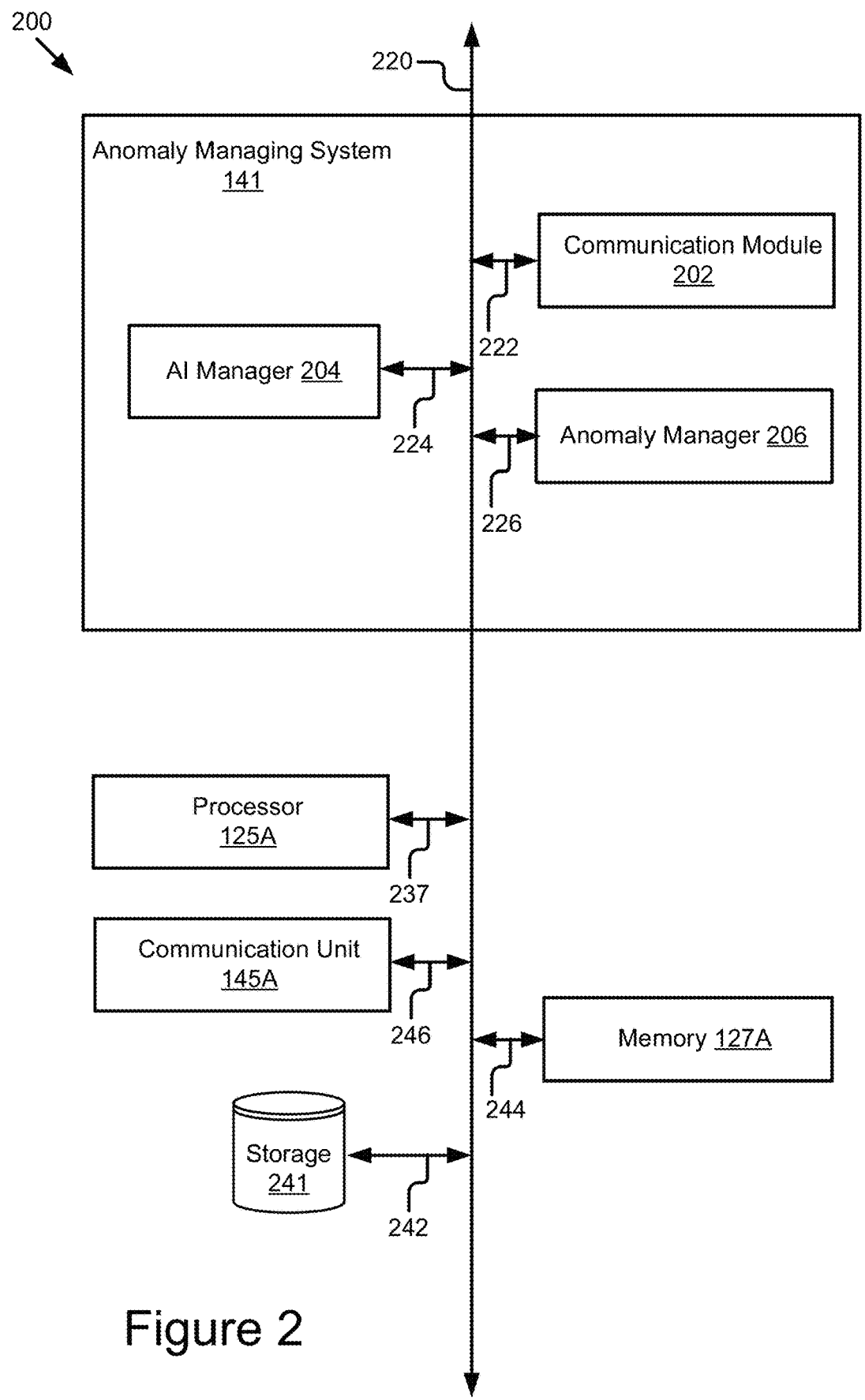
FIG. 2 is a block diagram illustrating an example computer system including the anomaly managing system according to some embodiments.

Referring now to FIG. 2, depicted is a block diagram illustrating an example computer system 200 including the anomaly managing system 141 according to some embodiments. In some embodiments, the computer system 200 may include a special-purpose computer system that is programmed to perform one or more steps of methods 300 and 400 described below with reference to FIGS. 3-4.

In some embodiments, the computer system 200 may be an element of the server 140. In some other embodiments, the computer system 200 may be an element of a vehicle (e.g., a leader vehicle or a following vehicle in a vehicle platoon, a member vehicle in a vehicular micro cloud, etc.).

The computer system 200 may include one or more of the following elements according to some examples: the anomaly managing system 141; the processor 125A; and the communication unit 145A. The computer system 200 may further include one or more of the following elements: the memory 127A; and a storage 241. The components of the computer system 200 are communicatively coupled by a bus 220.

In the illustrated embodiment, the processor 125A is communicatively coupled to the bus 220 via a signal line 237. The communication unit 145A is communicatively coupled to the bus 220 via a signal line 246. The storage 241 is communicatively coupled to the bus 220 via a signal line 242. The memory 127A is communicatively coupled to the bus 220 via a signal line 244.

The following elements are described above with reference to FIG. 1: the processor 125A; the communication unit 145A; and the memory 127A. Similar description will not be repeated here.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media (e.g., a hard disk drive, a floppy disk drive, a flash memory device, etc.) for storing information on a more permanent basis.

In the illustrated embodiment shown in FIG. 2, the anomaly managing system 141 includes: a communication module 202; an AI manager 204; and an anomaly manager 206. These components of the anomaly managing system 141 are communicatively coupled to each other via the bus 220. In some embodiments, components of the anomaly managing system 141 can be stored in a single server or device. In some other embodiments, components of the anomaly managing system 141 can be distributed and stored across multiple servers or devices.

The communication module 202 can be software including routines for handling communications between the anomaly managing system 141 and other components of the computer system 200. In some embodiments, the communication module 202 can be stored in the memory 127A of the computer system 200 and can be accessible and executable by the processor 125A. The communication module 202 may be adapted for cooperation and communication with the processor 125A and other components of the computer system 200 via a signal line 222.

The communication module 202 sends and receives data, via the communication unit 145A, to and from one or more elements of the operating environment 100. For example, the communication module 202 transmits, via the communication unit 145A, strategy data describing a control strategy to the vehicle 110 that is affected by an anomaly. The communication module 202 may send or receive any of the data or messages described above with reference to FIG. 1 via the communication unit 145A.

In some embodiments, the communication module 202 receives data from the other components of the anomaly managing system 141 and stores the data in one or more of the storage 241 and the memory 127A. The other components of the anomaly managing system 141 may cause the communication module 202 to communicate with the other elements of the computer system 200 or the operating environment 100 (via the communication unit 145A).

The AI manager 204 can be software including routines for determining hierarchical AI data associated with a roadway environment. In some embodiments, the AI manager 204 can be stored in the memory 127A of the computer system 200 and can be accessible and executable by the processor 125A. The AI manager 204 may be adapted for cooperation and communication with the processor 125A and other components of the computer system 200 via a signal line 224.

In some embodiments, the AI manager 204 receives sensor data from the vehicle 110 as well as other endpoints in the roadway environment (e.g., other vehicles, roadside units, etc.). The AI manager 204 aggregates the received sensor data. The AI manager 204 may determine current traffic information (e.g., real-time traffic information) based on the aggregated sensor data. The AI manager 204 may also determine predicted future traffic information based at least in part on the aggregated sensor data. Then, the AI manager 204 generates hierarchical AI data that describes one or more of the following: real-life traffic information; real-time traffic information; and predicted future traffic information. For example, the hierarchical AI data describes: (1) current locations, speeds, headings, etc., of various vehicles present in the roadway environment; and (2) predicted locations, speeds, headings, etc., of the various vehicles in a future time window.

In some embodiments, the AI manager 204 sends the hierarchical AI data to the anomaly manager 206.

The anomaly manager 206 can be software including routines for managing an anomaly and anomaly-affected entities. In some embodiments, the anomaly manager 206 can be stored in the memory 127A of the computer system 200 and can be accessible and executable by the processor 125A. The anomaly manager 206 may be adapted for cooperation and communication with the processor 125A and other components of the computer system 200 via a signal line 226.

In some embodiments, the anomaly manager 206 receives anomaly data describing an occurrence of an anomaly in a roadway environment. The anomaly data may include digital data describing one or more of the following: a type of the anomaly; a location of the anomaly; one or more parties that are involved in the anomaly directly; and a brief description of the anomaly, etc. For example, the brief description of the anomaly may include a series of actions involved in the anomaly.

The anomaly manager 206 determines an impact of the anomaly based at least in part on the anomaly data. The impact of the anomaly may describe a risk of the anomaly in the roadway environment. In some embodiments, the anomaly manager 206 determines an impact of the anomaly based on one or more of: the type of the anomaly; and a location of the anomaly.

For example, if the anomaly describes that a pedestrian suddenly screams on a sidewalk in a residential area, the anomaly manager 206 may determine that the impact of the anomaly in the roadway environment is relatively small. However, if the anomaly describes a car crash on a highway, the anomaly manager 206 may determine that the impact of the anomaly is significant.

The anomaly manager 206 determines an influence region of the anomaly based on one or more of: the impact of the anomaly; and one or more roadway condition parameters. The one or more roadway condition parameters include one or more of: a traffic condition parameter and; a road geometry parameter. The traffic condition parameter may describe a traffic condition in the roadway environment (e.g., a traffic congestion on a roadway, rush-hour traffic, or sparse traffic on a roadway, etc.). The traffic condition parameter can be a dynamic parameter. The road geometry parameter may describe a condition of a roadway in the roadway environment (e.g., a road in a mountainous area, a road with sharp turns, a road with a single lane in each direction, a road with multiple lanes in each direction, etc.). The road geometry parameter can be a static parameter.

For example, assume that the anomaly describes that a lane on a highway is closed during a time period of 12:00 AM-5:00 AM for maintenance and the highway has multiple lanes in each direction. The anomaly manager 206 determines an influence region of the anomaly as a relatively small area in the roadway environment (e.g., an area with a maximum distance to the anomaly being no greater than 100 meters) due to sparse traffic on the highway during this time period.

In another example, assume that the anomaly describes that a car crash occurs during rush hours on a highway. The anomaly manager 206 determines an influence region of the anomaly as a relatively large area in the roadway environment (e.g., an area of the highway that is around the location of anomaly and that covers at least a distance of multiple exits of the highway). This is because the impact of the anomaly is relatively large and there is heavy traffic on the highway during the rush hours.

The anomaly manager 206 determines a set of anomaly severity indices associated with a set of sub-regions within the influence region. Specifically, the anomaly manager 206 determines the set of anomaly severity indices based on one or more roadway condition parameters. The anomaly manager 206 divides the influence region into the set of sub-regions so that each sub-region is associated with a corresponding anomaly severity index from the set of anomaly severity indices.

For example, if the anomaly occurs on a highway with heavy traffic, the anomaly manager 206 may generate a first anomaly severity index, a second anomaly severity index and a third anomaly severity index for the influence region. The anomaly manager 206 divides the influence region into three sub-regions. The anomaly manager 206 associates a first sub-region that is immediately around (e.g., just behind or ahead of) the anomaly with the first anomaly severity index having an urgent impact-severity level. The anomaly manager 206 associates a second sub-region that is following the first sub-region with the second anomaly severity index having an intermediate impact-severity level. The anomaly manager 206 associates a third sub-region that is following the second sub-region with the third anomaly severity index having a moderate impact-severity level.

In another example, if the anomaly occurs in a country road with sparse traffic, the anomaly manager 206 may generate an anomaly severity index with a moderate impact-severity level. The anomaly manager 206 associates the entire influence region with the anomaly severity index having the moderate impact-severity level.

The anomaly manager 206 identifies a group of anomaly-affected entities within the influence region based on the hierarchical AI data. In some examples, the group of anomaly-affected entities includes a group of vehicles present within the influence region. The anomaly manager 206 manages the group of anomaly-affected entities within the influence region based on the set of anomaly severity indices.

Specifically, for each sub-region from the set of sub-regions, the anomaly manager 206 identifies one or more anomaly-affected entities within the sub-region. For example, the anomaly manager 206 receives the hierarchical AI data that describes one or more of real-time traffic information and predicted future traffic information in the roadway environment. The anomaly manager 206 identifies the one or more anomaly-affected entities within the sub-region based on the hierarchical AI data. In a further example, the hierarchical AI data describes: (1) current locations, speeds, headings, etc., of various vehicles present in the roadway environment; and (2) predicted locations, speeds, headings, etc., of the various vehicles in future time. Then, the anomaly manager 206 identifies one or more vehicles that are present within the sub-region based on the hierarchical AI data. The one or more vehicles are affected by the anomaly.

In some examples, the anomaly manager 206 dynamically computes a similarity score for each entity that is around the anomaly. The anomaly manager 206 identifies anomaly-affected entities within each sub-region based on similarity scores of the entities. For example, a similarity score of a particular entity can be computed as a distance between the entity and the anomaly. If the similarity score of the entity is no greater than a first threshold, the anomaly manager 206 determines that the entity is within the first sub-region of the influence region. If the similarity score of the entity is greater than the first threshold and no greater than a second threshold, the anomaly manager 206 determines that the entity is within the second sub-region of the influence region. If the similarity score of the entity is greater than the second threshold and no greater than a third threshold, the anomaly manager 206 determines that the entity is within the third sub-region of the influence region. Values for the first threshold, the second threshold and the third threshold can be determined based on a type of the anomaly and one or more roadway condition parameters or can be configured by a user.

For each sub-region from the set of sub-regions, the anomaly manager 206 generates a control strategy to manage the one or more anomaly-affected entities in the sub-region based on a corresponding anomaly severity index associated with the sub-region. In some embodiments, the control strategy includes one or more of the following: instructing the one or more anomaly-affected entities to change their lanes; and controlling the one or more anomaly-affected entities to change their speeds. The control strategy may further include one or more of the following: rerouting the one or more anomaly-affected entities; and detouring the one or more anomaly-affected entities.

For example, the anomaly manager 206 generates a first control strategy for first anomaly-affected entities present within a first sub-region. The first sub-region is immediately around the anomaly and associated with a first anomaly severity index having an urgent impact-severity level. The first control strategy instructs the first anomaly-affected entities in the first sub-region to change their lanes immediately. The anomaly manager 206 generates a second control strategy for second anomaly-affected entities present within a second sub-region. The second sub-region is following the first sub-region and associated with a second anomaly severity index having an intermediate impact-severity level. The second control strategy provides speed advisory to the second anomaly-affected entities in the second sub-region (e.g., advising the second anomaly-affected entities to change their speeds). The anomaly manager 206 generates a third control strategy for third anomaly-affected entities present within a third sub-region. The third sub-region is following the second sub-region and associated with a third anomaly severity index having a moderate impact-severity level. The third control strategy may reroute the third anomaly-affected entities.

For each sub-region from the set of sub-regions, the anomaly manager 206 instructs the one or more anomaly-affected entities in the sub-region to execute the corresponding control strategy. For example, the anomaly manager 206 may send strategy data describing the corresponding control strategy to the one or more anomaly-affected entities via a V2X communication. A receipt of the strategy data at the one or more anomaly-affected entities may cause the one or more anomaly-affected entities to carry out the corresponding control strategy. For example, a receipt of the strategy data at the vehicle 110 can modify an operation of an Advanced Driver Assistance System (ADAS system) of the vehicle 110 so that the ADAS system operates the vehicle 110 based on the control strategy.

Example Processes

Figure 3:
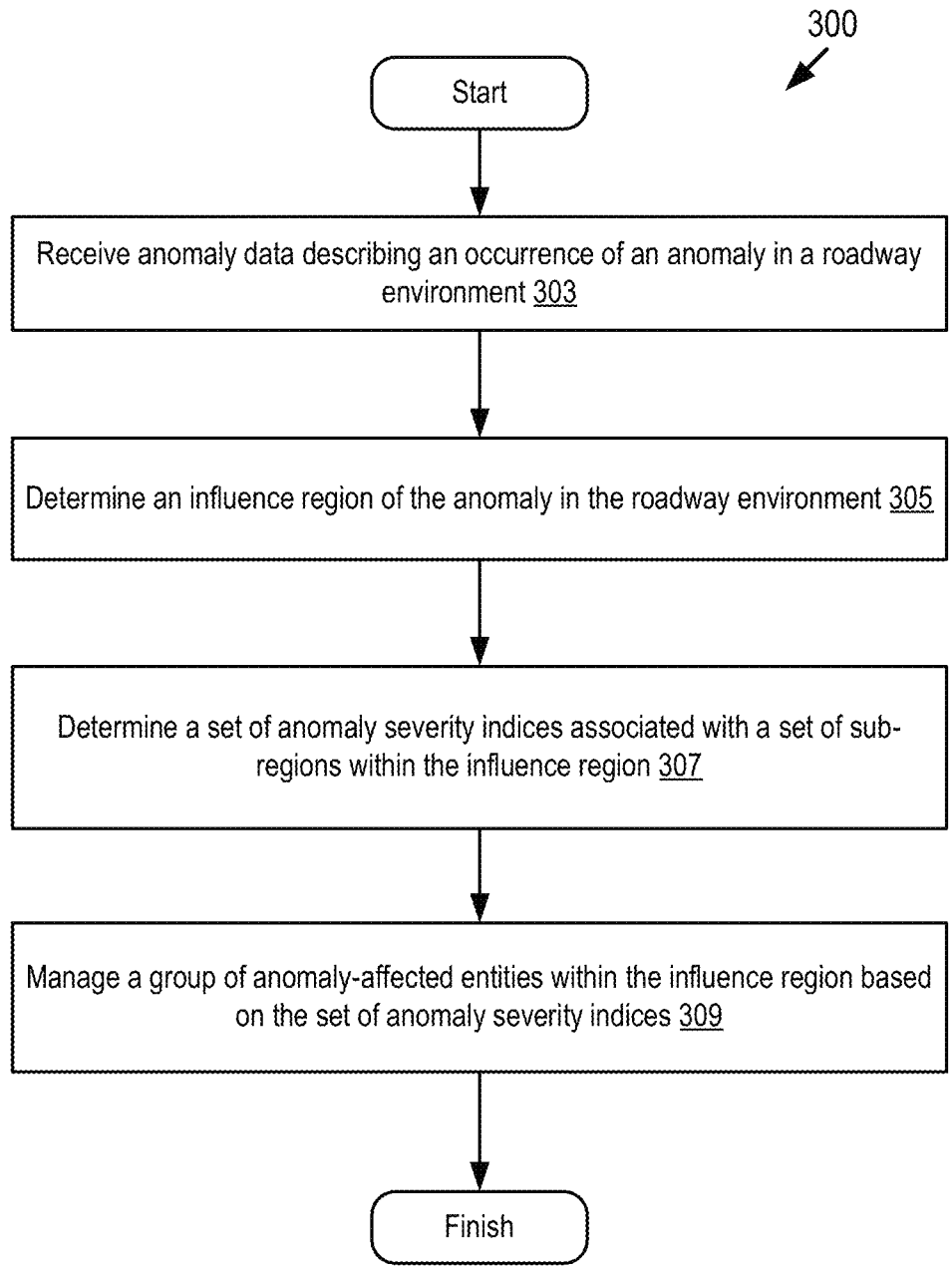
FIG. 3 depicts a method for managing an anomaly and a group of entities affected by the anomaly according to some embodiments.

Referring now to FIG. 3, depicted is a flowchart of an example method 300 for managing an anomaly and a group of anomaly-affected entities according to some embodiments. The steps of the method 300 are executable in any order, and not necessarily the order depicted in FIG. 3.

At step 303, the anomaly manager 206 receives anomaly data describing an occurrence of an anomaly in a roadway environment.

At step 305, the anomaly manager 206 determines an influence region of the anomaly in the roadway environment.

At step 307, the anomaly manager 206 determines a set of anomaly severity indices associated with a set of sub-regions within the influence region.

At step 309, the anomaly manager 206 manages a group of anomaly-affected entities within the influence region based on the set of anomaly severity indices.

Figure 4:
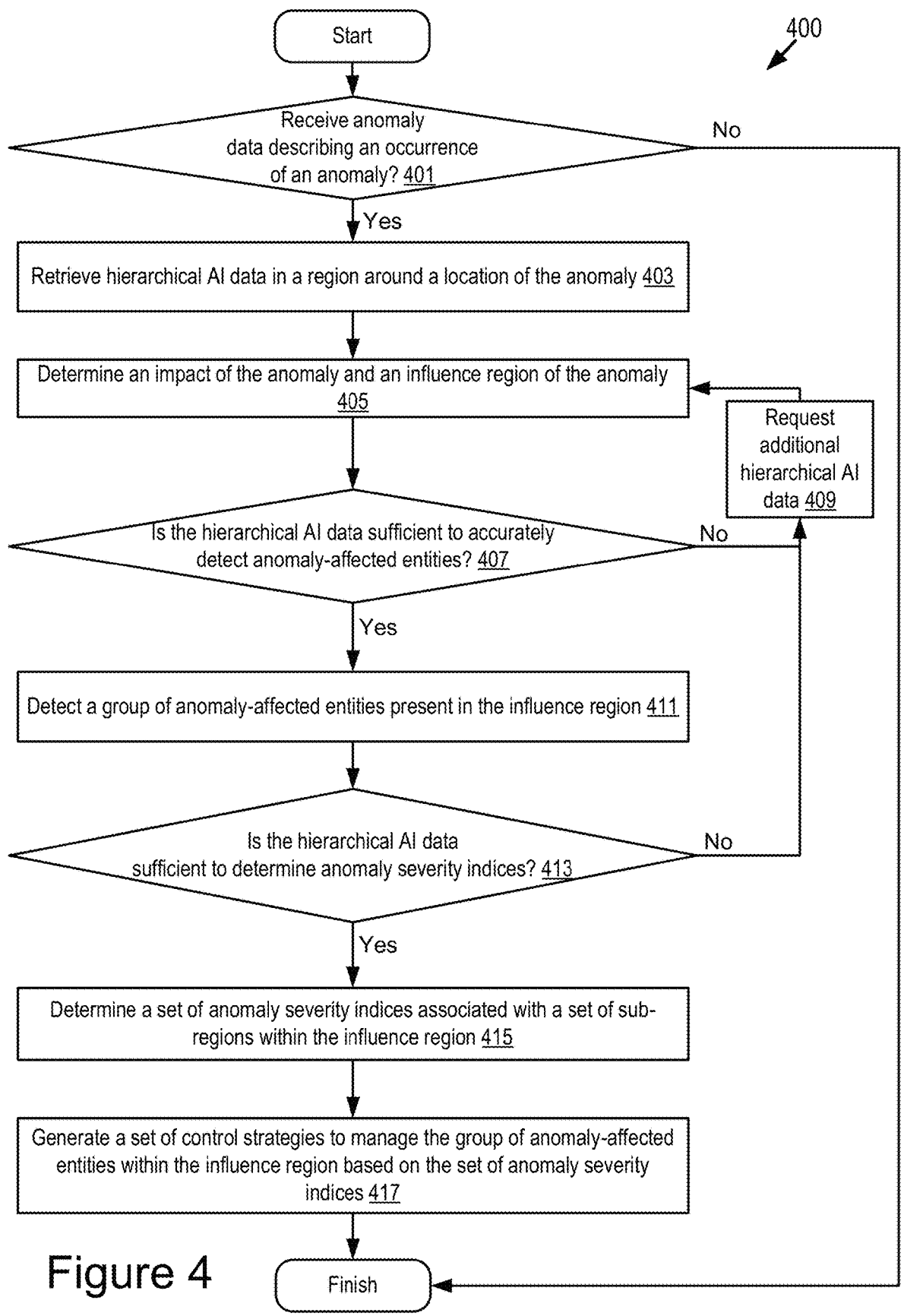
FIG. 4 depicts another method for managing an anomaly and a group of entities affected by the anomaly according to some embodiments.

FIG. 4 depicts another method 400 for managing an anomaly and a group of anomaly-affected entities according to some embodiments. The steps of the method 400 are executable in any order, and not necessarily the order depicted in FIG. 4.

At step 401, the anomaly manager 206 determines whether anomaly data describing an occurrence of an anomaly is received. Responsive to receiving the anomaly data, the method 400 moves to step 403. Otherwise, the method 400 ends.

At step 403, the anomaly manager 206 retrieves hierarchical AI data in a region around a location of the anomaly.

At step 405, the anomaly manager 206 determines an impact of the anomaly and an influence region of the anomaly.

At step 407, the anomaly manager 206 determines whether the hierarchical AI data is sufficient to accurately detect anomaly-affected entities in the influence region. Responsive to the hierarchical AI data being sufficient to accurately detect anomaly-affected entities, the method 400 moves to step 411. Otherwise, the method 400 moves to step 409.

At step 409, the anomaly manager 206 requests additional hierarchical AI data from the AI manager 204. Then, the method 400 moves back to step 405.

At step 411, the anomaly manager 206 detects a group of anomaly-affected entities present in the influence region.

At step 413, the anomaly manager 206 determines whether the hierarchical AI data is sufficient to determine anomaly severity indices. Responsive to the hierarchical AI data being sufficient to determine anomaly severity indices, the method 400 moves to step 415. Otherwise, the method 400 moves to step 409.

At step 415, the anomaly manager 206 determines a set of anomaly severity indices associated with a set of sub-regions within the influence region.

At step 417, the anomaly manager 206 generates a set of control strategies to manage the group of anomaly-affected entities within the influence region based on the set of anomaly severity indices.

Figure 5A:
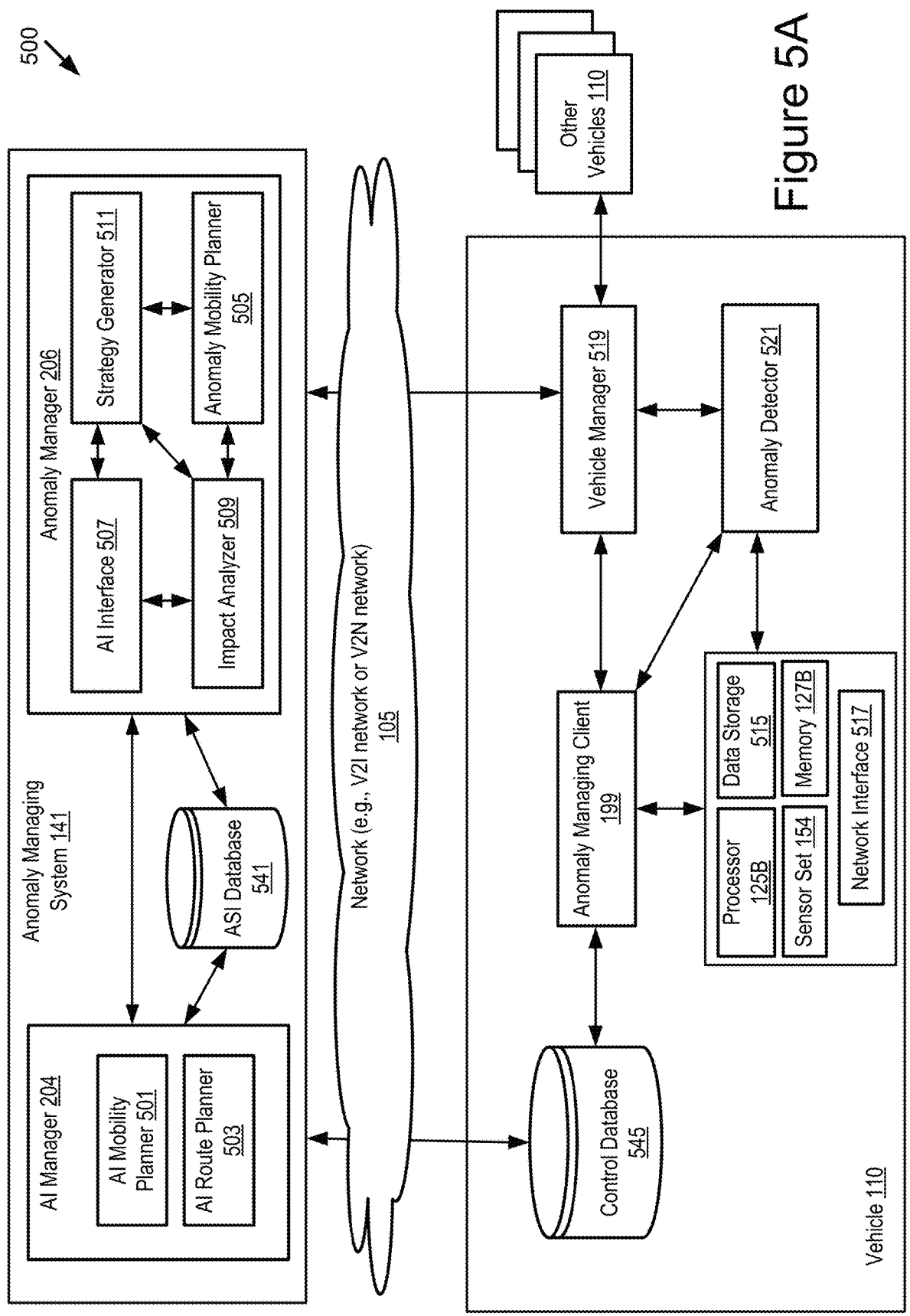
FIG. 5A is a block diagram illustrating an architecture for the anomaly managing system and the anomaly managing client according to some embodiments.

Referring to FIG. 5A, an example architecture 500 for the anomaly managing system 141 and the anomaly managing client 199 is illustrated. The anomaly managing system 141 may be installed in the server 140. The vehicle 110 may detect an occurrence of an anomaly. The vehicle 110 may be affected by the anomaly.

Besides the elements described above with reference to FIG. 1, the vehicle 110 may also include a data storage 515, a network interface 517, a control database 545, a vehicle manager 519 and an anomaly detector 521.

The anomaly detector 521 may include code and routines for detecting an occurrence of an anomaly in the roadway environment. For example, the anomaly detector 521 may detect the occurrence of the anomaly by performing operations described in U.S. application Ser. No. 16/273,134, filed on Feb. 11, 2019, titled "Anomaly Mapping by Vehicular Micro Clouds," the entirety of which is incorporated herein by reference.

The vehicle manager 519 may include code and routines for performing coordination with other vehicles 110 via V2X communications. For example, the vehicle manager 519 may manage (e.g., establish and maintain) inter-vehicular wireless links and control executions of collaborative operations among the vehicles 110.

The anomaly managing client 199 of the vehicle 110 may cause the vehicle manager 519 to send sensor data recorded by the vehicle 110 to the anomaly managing system 141. The sensor data can be recorded by the sensor set 154 and forwarded to the anomaly managing client 199 and the anomaly detector 521 from the sensor set 154.

The anomaly managing client 199 may also receive anomaly data describing the anomaly from the anomaly detector 521. The anomaly managing client 199 may send, via the vehicle manager 519, the anomaly data to the anomaly managing system 141.

Turning to the AI manager 204, in some embodiments the AI manager 204 may include one or more of the following elements: an AI mobility planner 501; and an AI route planner 503.

The AI mobility planner 501 is operable to continuously monitor mobility information of connected entities (e.g., vehicles) and store current route information and predicted route information of the connected entities. The AI mobility planner 501 may generate the hierarchical AI data based at least on the current route information and predicted route information of the connected entities and any other information of the connected entities (e.g., speed data, heading data, etc.).

The AI route planner 503 may be operable to plan routes for the connected entities based on the hierarchical AI data. In some embodiments, the AI route planner 503 may assist the anomaly manager 206 to plan routes for the anomaly-affected entities responsive to the occurrence of the anomaly.

Turning to the anomaly manager 206, in some embodiments the anomaly manager 206 may include one or more of the following elements: an anomaly mobility planner 505; an AI interface 507; an impact analyzer 509; and a strategy generator 511.

The anomaly mobility planner 505 may be operable to monitor information of anomalies present in the roadway environment. This information may include, but is not limited to, one or more of the following: location information; description information; and any other information related to the anomaly.

The AI interface 507 may be operable to retrieve hierarchical AI data associated with the roadway environment from the AI manager 204.

The impact analyzer 509 may be operable to determine an impact of the anomaly. The impact analyzer 509 may also determine an influence region of the anomaly based on one or more roadway condition parameters and the impact of the anomaly. The impact analyzer 509 determines a set of anomaly severity indices associated with a set of sub-regions within the influence region.

In some embodiments, the anomaly data and the set of anomaly severity indices are stored in an ASI database 541.

The strategy generator 511 may be operable to manage anomaly-affected entities within the influence region based on the set of anomaly severity indices. For example, for each sub-region from the set of sub-regions, the strategy generator 511 identifies, one or more anomaly-affected entities within the sub-region. The strategy generator 511 generates a corresponding control strategy to manage the one or more anomaly-affected entities in the sub-region based on a corresponding anomaly severity index associated with the sub-region. The strategy generator 511 instructs the one or more anomaly-affected entities in the sub-region to execute the corresponding control strategy. As a result, the strategy generator 511 generates a set of control strategy to manage anomaly-affected entities in the influence region based on the set of anomaly severity indices.

For example, with respect to the vehicle 110 which is affected by the anomaly, the strategy generator 511 identifies that the vehicle 110 is present within a particular sub-region that is associated with a particular anomaly severity index. The strategy generator 511 generates a control strategy for the vehicle 110 based on the particular anomaly severity index. The strategy generator 511 sends strategy data describing the control strategy to the vehicle 110.

After receiving the strategy data, the anomaly managing client 199 of the vehicle 110 may store the strategy data in a control database 545. The anomaly managing client 199 may inform the vehicle manager 519 about the received strategy data. The anomaly managing client 199 ensures that the vehicle manager 519 follows the control strategy described by the strategy data so that the vehicle 110 operates in accordance with the control strategy to mitigate an effect of the anomaly. For example, assume that the control strategy instructs the vehicle 110 to change a lane immediately. Then, the vehicle manager 519 can modify an operation of an ADAS system of the vehicle 110 so that the ADAS system controls the vehicle 110 to change its lane immediately.

Figure 5B:
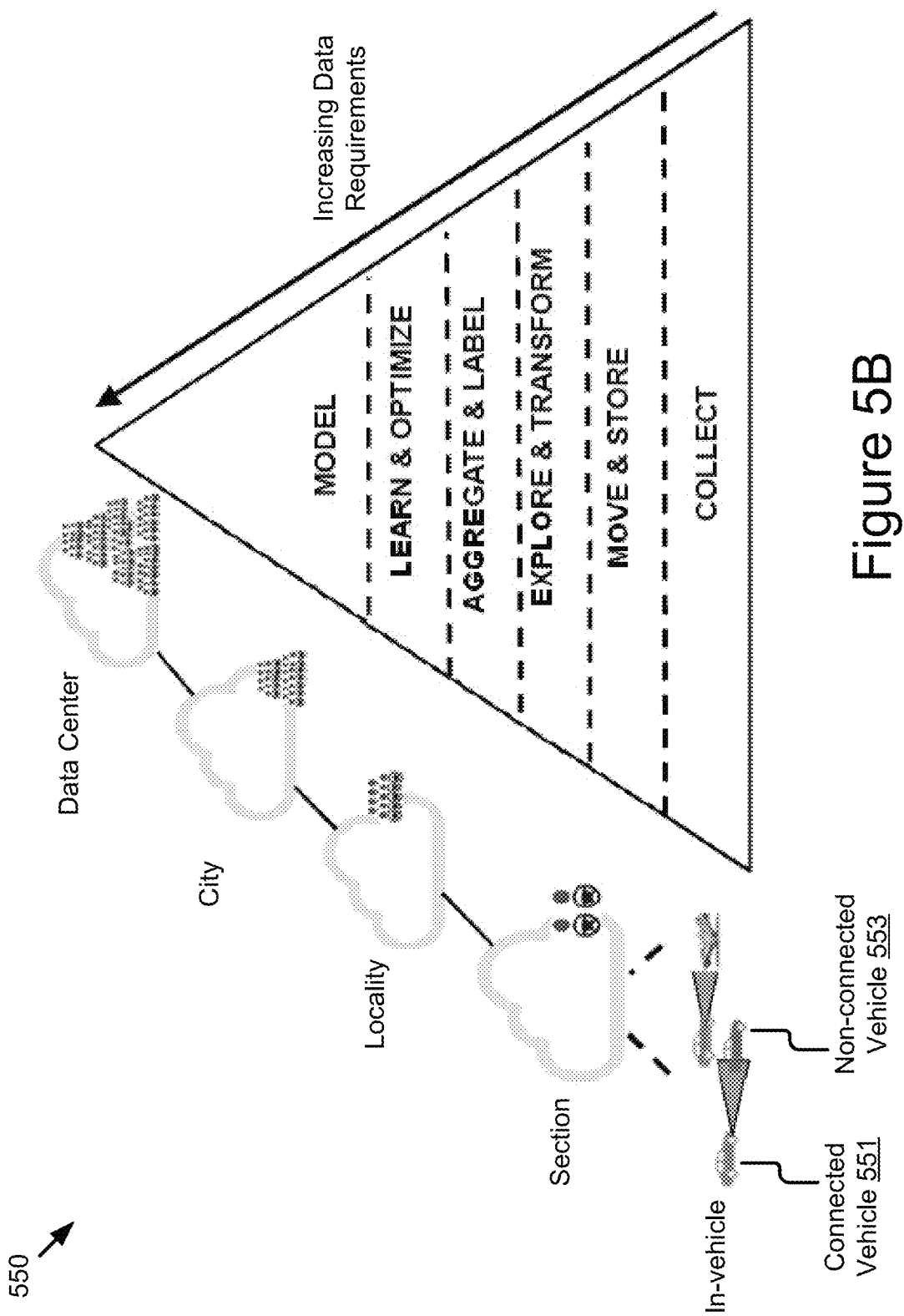
FIG. 5B is a graphical representation illustrating an example approach for learning hierarchical AI data according to some embodiments.

FIG. 5B is a graphical representation illustrating an example approach 550 for learning hierarchical AI data according to some embodiments. In the example approach 550, the hierarchical AI data is learned hierarchically from large scale and fragmented vehicle data (e.g., sensor data from vehicles) in real time. The vehicles can include connected vehicles 551 and non-connected vehicles 553.

Various types of vehicle data are collected including, but not limited to, instrumentation data, logging data, sensor data or any other type of data. Reliable streams of data can be stored in data storages (either structured or unstructured data storages) so that a reliable data flow is established.

The data collected through the reliable data flow is explored and transformed via, e.g., data cleaning and data preparation, etc. Any missing data in the data flow can be identified.

Business intelligence can be used to define metrics to track and evaluate the data. For example, various analytics methods and different metrics can be used to evaluate the data. The data can be aggregated and labeled. Features of the data can be extracted and used as training data. After a series of operations are performed on the data, the data can be modeled using one or more data models.

Figure 6:
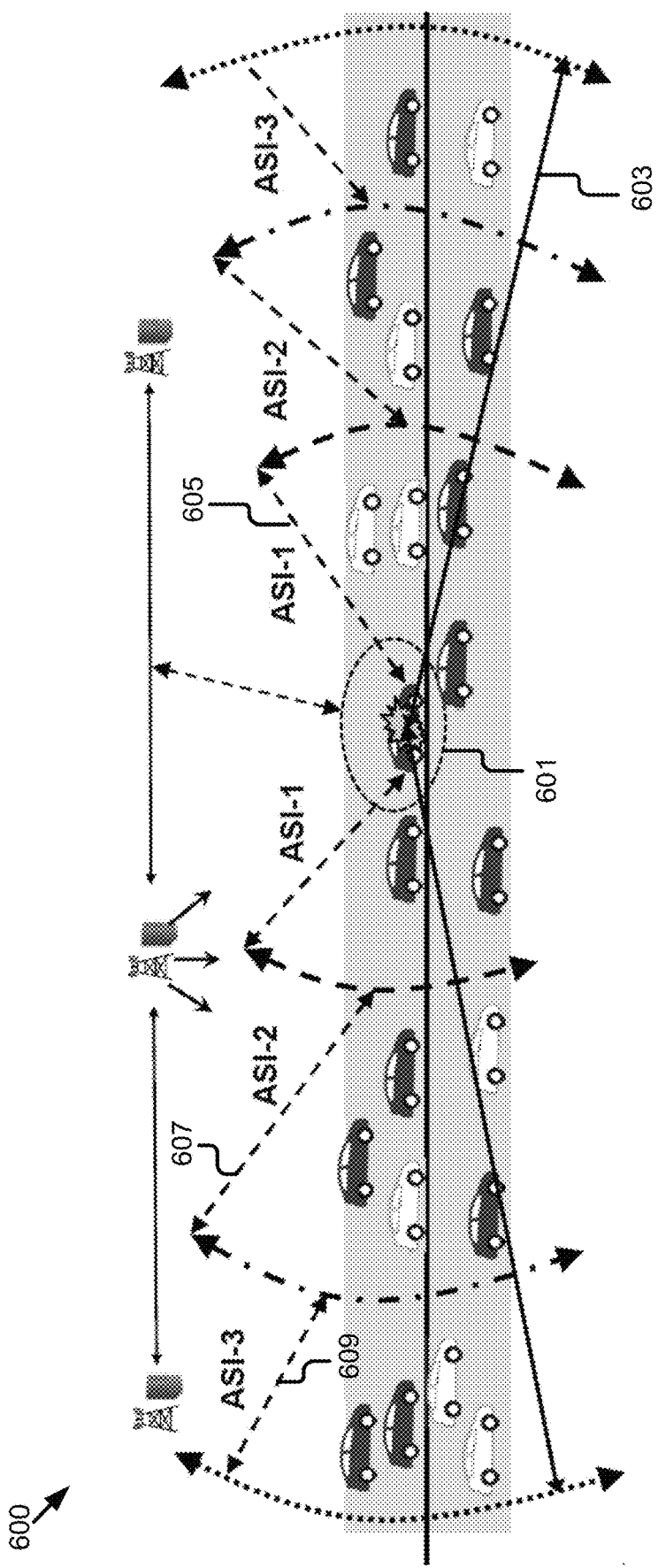
FIG. 6 is a graphical representation illustrating an example of managing an anomaly and a group of entities affected by the anomaly according to some embodiments.

FIG. 6 is a graphical representation illustrating an example 600 of managing an anomaly and a group of anomaly-affected entities according to some embodiments. Initially, an occurrence of an anomaly is detected at a location 601 in a roadway environment. Responsive to receiving anomaly data describing the anomaly, the anomaly managing system 141 determines an influence region of the anomaly. For example, the influence region includes a range centered at the location 601 of the anomaly with a maximum distance 603 to the location 601.

The anomaly managing system 141 determines a first anomaly severity index ASI-1, a second anomaly severity index ASI-2 and a third anomaly severity index ASI-3 for the influence region. The anomaly managing system 141 divides the influence region into three sub-regions. A first sub-region includes an area in the roadway environment that covers the location 601 of the anomaly and has a maximum distance 605 to the location 601. The first sub-region is associated with the first anomaly severity index ASI-1. A second sub-region includes an area that is following the first sub-region with a maximum distance 607 to a boundary of the first sub-region. The second sub-region is associated with the second anomaly severity index ASI-2. A third sub-region includes an area that is following the second sub-region with a maximum distance 609 to a boundary of the second sub-region. The third sub-region is associated with the third anomaly severity index ASI-3.

The anomaly managing system 141 identifies corresponding vehicles in the first, second and third sub-regions, respectively. The anomaly managing system 141 generates a first control strategy to manage vehicles in the first sub-region, a second control strategy to manage vehicles in the second sub-region and a third control strategy to manage vehicles in the third sub-region, respectively.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer program product comprising a non-transitory memory of a computer system storing computer-executable code that, when executed by a processor, causes the processor to:
    receive anomaly data describing an occurrence of an anomaly in a roadway environment;
    determine an influence region of the anomaly in the roadway environment;
    determine a set of anomaly severity indices associated with a set of sub-regions within the influence region;
    generate a similarity score for each anomaly-affected entity in a group of anomaly-affected entities that is within the influence region of the anomaly;
    determine which sub-region of the set of sub-regions each of the anomaly-affected entities belongs to based on the similarity score; and
    generate a set of route management instructions to manage the group of anomaly-affected entities within the influence region based on the set of anomaly severity indices, wherein the set of route management instructions are personalized for the anomaly-affected entities in each sub-region and the set of route management instructions improve safety for the group of anomaly-affected entities.

2. The computer program product of claim 1, wherein the computer-executable code, when executed by the processor, causes the processor to generate the set of control strategies to manage the group of anomaly-affected entities within the influence region at least by:
    identifying, for each sub-region from the set of sub-regions, one or more anomaly-affected entities within the sub-region;
    generating a plurality of corresponding control strategies for different anomaly-affected entities of the group to manage the one or more anomaly-affected entities within the sub-region based on a corresponding anomaly severity index associated with the sub-region, wherein the plurality of corresponding control strategies are personalized for the anomaly-affected entities included in the group; and
    instructing the one or more anomaly-affected entities within the sub-region to execute their corresponding control strategy which is personalized for them.

3. The computer program product of claim 1, wherein the computer-executable code, when executed by the processor, causes the processor to identify, for each sub-region from the set of sub-regions, the group of anomaly-affected entities within the sub-region at least by:
    receiving hierarchical Artificial Intelligence (AI) data that describes one or more of real-time traffic information and predicted future traffic information in the roadway environment; and
    identifying the group of anomaly-affected entities within the sub-region based on the hierarchical AI data.

4. The computer program product of claim 1, wherein the group of anomaly-affected entities includes a set of connected vehicles that are members of a vehicular micro cloud, wherein one or more of the connected vehicles are autonomous vehicles that implement the route management instructions.

5. A method comprising:
    receiving anomaly data describing an occurrence of an anomaly in a roadway environment;
    determining an influence region of the anomaly in the roadway environment;
    determining a set of anomaly severity indices associated with a set of sub-regions within the influence region;
    generating a similarity score for each anomaly-affected entity in a group of anomaly-affected entities that is within the influence region of the anomaly;
    determining which sub-region of the set of sub-regions each of the anomaly-affected entities belongs to based on the similarity score; and generating a set of route management instructions to manage the group of anomaly-affected entities within the influence region based on the set of anomaly severity indices, wherein the set of route management instructions are personalized for the anomaly-affected entities in each sub-region and the set of route management instructions improve safety for the group of anomaly-affected entities.

6. The method of claim 5, wherein managing the group of anomaly-affected entities within the influence region based on the set of anomaly severity indices comprises:
identifying, for each sub-region from the set of sub-regions, one or more anomaly-affected entities within the sub-region;
generating a control strategy to manage the one or more anomaly-affected entities based on a corresponding anomaly severity index associated with the sub-region; and
instructing the one or more anomaly-affected entities to execute the control strategy.

7. The method of claim 6, wherein identifying, for each sub-region from the set of sub-regions, the one or more anomaly-affected entities within the sub-region comprises:
receiving hierarchical Artificial Intelligence (AI) data that describes one or more of real-time traffic information and predicted future traffic information in the roadway environment; and
identifying the one or more anomaly-affected entities within the sub-region based on the hierarchical AI data.

8. The method of claim 6, wherein the control strategy includes one or more of the following: instructing the one or more anomaly-affected entities to change their lanes; controlling the one or more anomaly-affected entities to change their speeds; rerouting the one or more anomaly-affected entities; or detouring the one or more anomaly-affected entities.

9. The method of claim 5, wherein:
the similarity score is based on a distance between a respective anomaly-affected entity; and
the anomaly and the respective anomaly-affected entity is determined to be part of a first sub-region based on the similarity score being within a threshold score.

10. The method of claim 5, wherein determining the influence region of the anomaly in the roadway environment comprises:
determining an impact of the anomaly; and
determining the influence region of the anomaly based on one or more roadway condition parameters and the impact of the anomaly.

11. The method of claim 10, wherein determining the set of anomaly severity indices associated with the set of sub-regions within the influence region comprises:
determining the set of anomaly severity indices based on the one or more roadway condition parameters; and
dividing the influence region into the set of sub-regions so that each sub-region is associated with a corresponding anomaly severity index from the set of anomaly severity indices.

12. The method of claim 10, wherein the one or more roadway condition parameters include one or more of a traffic condition parameter or a road geometry parameter.

13. A system comprising:
a computer system including a non-transitory memory storing computer code which, when executed by the computer system, causes the computer system to:
receive anomaly data describing an occurrence of an anomaly in a roadway environment;
determine an influence region of the anomaly in the roadway environment;
determine a set of anomaly severity indices associated with a set of sub-regions within the influence region;
generate a similarity score for each anomaly-affected entity in a group of anomaly-affected entities that is within the influence region of the anomaly;
determine which sub-region of the set of sub-regions each of the anomaly-affected entities belongs to based on the similarity score; and
generate a set of route management instructions to manage the group of anomaly-affected entities within the influence region based on the set of anomaly severity indices, wherein the set of route management instructions are personalized for the anomaly-affected entities in each sub-region and the set of route management instructions.

14. The system of claim 13, wherein the computer code, when executed by the computer system, causes the computer system to manage the group of anomaly-affected entities within the influence region at least by:
identifying, for each sub-region from the set of sub-regions, one or more anomaly-affected entities within the sub-region;
generating a control strategy to manage the one or more anomaly-affected entities based on a corresponding anomaly severity index associated with the sub-region; and
instructing the one or more anomaly-affected entities to execute the control strategy.

15. The system of claim 14, wherein the computer code, when executed by the computer system, causes the computer system to identify, for each sub-region from the set of sub-regions, the one or more anomaly-affected entities within the sub-region at least by:
receiving hierarchical Artificial Intelligence (AI) data that describes one or more of real-time traffic information and predicted future traffic information in the roadway environment; and
identifying the one or more anomaly-affected entities within the sub-region based on the hierarchical AI data.

16. The system of claim 14, wherein the control strategy includes one or more of the following: instructing the one or more anomaly-affected entities to change their lanes; controlling the one or more anomaly-affected entities to change their speeds; rerouting the one or more anomaly-affected entities; or detouring the one or more anomaly-affected entities.

17. The system of claim 14, wherein the control strategy includes a swarm function that instructs the anomaly-affected entities to navigate to a region at a similar time and drive in a formation that is operable to reduce or eliminate a risk caused by the anomaly.

18. The system of claim 13, wherein the computer code, when executed by the computer system, causes the computer system to determine the influence region of the anomaly in the roadway environment at least by:
determining an impact of the anomaly; and
determining the influence region of the anomaly based on one or more roadway condition parameters and the impact of the anomaly.

19. The system of claim 18, wherein the computer code, when executed by the computer system, causes the computer system to determine the set of anomaly severity indices associated with the set of sub-regions within the influence region at least by:

determining the set of anomaly severity indices based on the one or more roadway condition parameters; and dividing the influence region into the set of sub-regions so that each sub-region is associated with a corresponding anomaly severity index from the set of anomaly severity indices.

20. The system of claim 18, wherein the one or more roadway condition parameters include one or more of a traffic condition parameter and a road geometry parameter.

* * * * *